United States Patent [19]

Ando et al.

[11] Patent Number: 5,280,206
[45] Date of Patent: Jan. 18, 1994

[54] ARMATURE STATOR

[75] Inventors: Shigenori Ando, Narashino; Seiji Hiroki, Naka; Tetsuya Abe, Naka; Yoshio Murakami, Naka, all of Japan

[73] Assignee: Seiko Seiki Kabushiki Kaisha, Japan

[21] Appl. No.: 911,453

[22] Filed: Jul. 10, 1992

[30] Foreign Application Priority Data

Jul. 16, 1991 [JP] Japan .................................. 3-175423

[51] Int. Cl.⁵ ............................................ H02K 15/10
[52] U.S. Cl. ........................................ 310/42; 310/45;
310/254; 336/205; 427/104
[58] Field of Search .................... 310/45, 42, 215, 254;
336/205; 427/104

[56] References Cited

U.S. PATENT DOCUMENTS

| | | | |
|---|---|---|---|
| 3,634,164 | 1/1972 | Van Hirtum | 336/205 X |
| 4,698,538 | 10/1987 | Yoshida | 310/179 |
| 5,140,292 | 8/1992 | Aronow | 336/205 |

*Primary Examiner*—Emanuel T. Voeltz
*Assistant Examiner*—Judson H. Jones
*Attorney, Agent, or Firm*—Bruce L. Adams; Van C. Wilks

[57] ABSTRACT

An armature stator comprises an iron core and a coil directly mounted on the iron core. The coil is composed of wound electric wire which has a coating comprising an inorganic material, such as ceramic. A bonding material of the inorganic material is formed over the coil and iron core for filling any gaps and adhering the coil and iron core together into a unitary structure. To improve the reliability of the coil, after the electric wire is wound to form the coil, a filling material comprised of the inorganic material is formed over the coil by vacuum impregnation, and then sintered so as to repair defects in the coating disposed on the electric wire. After the bonding material is formed over the coil, which is directly mounted on the iron core, it is cured under high temperature. The armature stator thus constructed can be used with high reliability in high temperature and high vacuum applications.

19 Claims, 1 Drawing Sheet

ARMATURE STATOR

BACKGROUND OF THE INVENTION

The present invention relates to a member (hereinafter referred to as armature stator) which comprises a coil and an iron core, such as an electromagnet, an induction coil-type displacement sensor, etc.

Among the armature stators of this kind, those which are placed in an environment of high temperature and very high vacuum conditions have heretofore used a coil whose surface is coated with an inorganic material. When directly mounted on the iron core, however, the surface of the coil is scratched and the insulating property of the coil is destroyed. As shown in FIG. 3, therefore, the coil has been mounted on an iron core 3 via a bobbin 2. Here, the bobbin 2 is made of a material having an insulating property and is firmly press-fitted onto the iron core 3.

However, according to such a conventional armature stator in which the coil 1 is mounted on the iron core 3 via the bobbin 2, the armature stator tends to become bulkier by the thickness of the bobbin 2, which results in an increase in the leakage of magnetic flux. Moreover, since the bobbin 2 is fixed onto the iron core 3 by press fitting, the press-fit joined portion inevitably becomes loosened, and reliability of the armature stator is lost.

SUMMARY OF THE INVENTION

The present invention overcomes the drawbacks of the conventional. It is an object of the present invention to provide an armature stator which is small in size, exhibits excellent reliability in strength and is adapted to be used in a high temperature and very high vacuum environment. In order to achieve the above object, the present invention provides an armature stator comprising a coil made of an electric wire. The surface of the coil is coated with an inorganic material and an coil is mounted, on an iron core. The coil and said iron core are directly bonded together as a unitary structure using an adhesive material of the same type as said inorganic material.

According to the present invention, the coil and the iron core are directly bonded together as a unitary structure using an adhesive material of the same type as the inorganic material that is applied to the surface of the coil. Therefore, the coil and the iron core are strongly bonded together without requiring a bobbin or the like, yet the insulating property of the coil is maintained.

DESCRIPTION OF THE PREFERRED EMBODIMENTS

Figure 1:
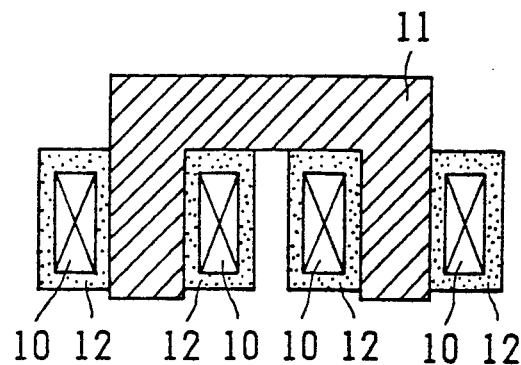
FIG. 1 is a sectional view of an armature stator according to the present invention.

The armature stator according to an embodiment of the present invention will now be described in detail with reference to FIGS. 1 and 2.

The armature stator has a coil made of an electric wire the surface of which is coated with a ceramic material as an inorganic material. A coil 10 made of a ceramic coated electric wire is mounted on an iron core 11 as shown in FIG. 1, the coil 10 and the iron core 11 being directly adhesion bonded together as a unitary structure using an adhesive material 12 of the type same as the above ceramic material.

Figure 2:
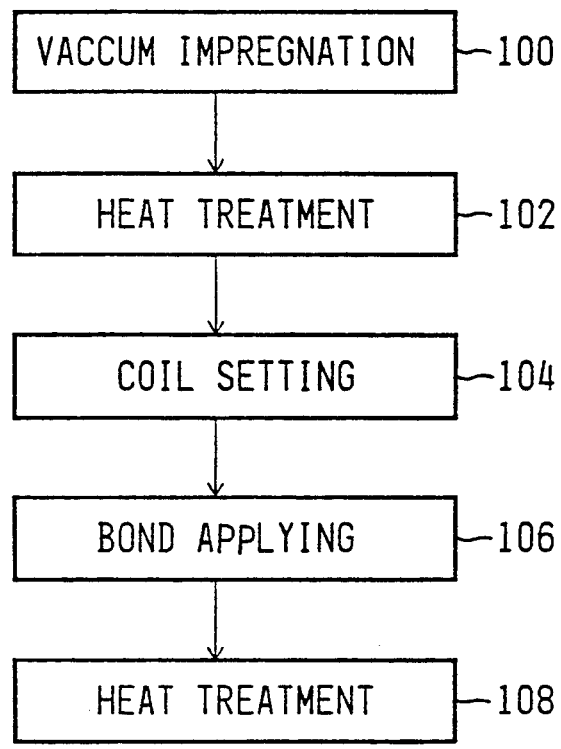
FIG. 2 is a diagram illustrating the principal steps for producing the armature stator according to the present invention.
Figure 3:
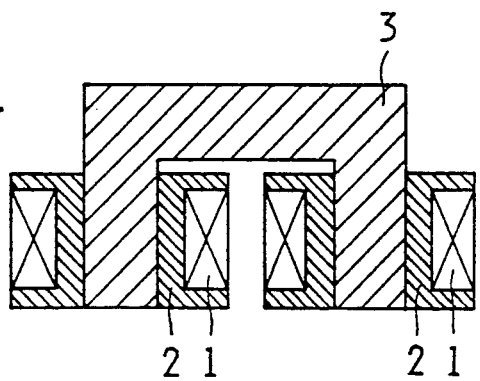
FIG. 3 is a sectional view of a conventional armature stator.

FIG. 2 shows the principal steps for producing the above-mentioned armature stator. A ceramic coated electric wire is helically wound to obtain the coil 10 of ceramic coated wire which is then impregnated with the adhesive material 12 by the vacuum impregnation method (step 100). The coil 10, as well as a filling layer comprised of the adhesive material 12, are sintered in an electric furnace (step 102). Therefore, cracks and defects developed at the time of forming the coil are filled, making it possible to reliably prevent defective insulation.

Thereafter, in order to directly bond the coil 10 and the iron core 11 as a unitary structure using the adhesive material 12, the coil 10 is mounted on the iron core 11 (step 104). A bonding layer comprised of the adhesive material 12 is applied to the coil 10 and the iron core 11, so as to fill any gaps after the coil 10 has been mounted (step 106). The coil 10 and the iron core 11 are dried and cured together with the adhesive material 12 in a high-temperature vessel (step 108).

According to the aforementioned armature stator, therefore, the coil and the iron core are directly adhesion bonded together as a unitary structure using an adhesive material that is the same type as the ceramic material of the coil of the ceramic coated electric wire; i.e., the coil and the iron core are firmly bonded together without using a bobbin or, the like, and yet the insulating property of the coil is maintained.

Moreover, the above-mentioned armature stator which uses same type adhesive material as the ceramic coating material generate very small amounts of gases even when it is placed in a high temperature and very high vacuum condition, enabling a clean environment to be obtained, and lending itself well for use in a high temperature and very high vacuum environment.

Though the above-mentioned embodiment employs a ceramic material as the inorganic material, the same effects can also be obtained using other inorganic materials in its place.

The armature stator according to the present invention comprises a coil and an iron core that are directly adhesion bonded together using an adhesive material of the same type as the inorganic material with which the surface of the coil is coated. Thus enabling the coil and the iron core to be strongly bonded together without using a bobbin or the like. The insulating property of the coil is maintained and the armature stator can have a small size, a reduced magnetic flux leakage and improved reliability.

What is claimed:

1. An armature stator comprising: a coil formed by winding an electric wire, the surface of the electric wire being coated with an inorganic material and the surface of the coil being coated with an adhesive comprising the inorganic material; and an iron core having said coil mounted thereon such that the coil and the iron core are directly adhesion bonded together as a unitary structure using the adhesive material comprising the inorganic material.

2. An armature stator, comprising: an iron core; a coil directly mounted on the iron core and composed of wound electric wire, the electric wire having a coating composed of an insulating material; and a bonding material composed of the insulating material and formed over the coil and iron core for filling a gap between the coil and the iron core and for adhering the coil and the iron core together so that a unitary structure is formed comprises of the coil directly mounted on the iron core.

3. An armature stator according to claim 2; wherein the insulating material comprises an inorganic material.

4. An armature stator according to claim 2; wherein the insulating material comprises a ceramic material.

5. An armature stator according to claim 2; further comprising a filling material composed of the insulating material and formed over the coil by vacuum impregnation for repairing defects in the coating on the electric wire.

6. An armature stator according to claim 5; wherein the filling material formed over the coil is sintered.

7. An armature stator according to claim 5; wherein the filling material and the bonding material are comprised of the same material.

8. An armature stator according to claim 5; wherein the filling material, bonding material and coating are all comprised of the same material.

9. An armature stator according to claim 2; wherein the coating and bonding material are comprised of the same material.

10. An armature stator according to claim 2; wherein the bonding material formed over the coil and the iron core is cured under high temperature.

11. A method of making an armature stator, comprising the steps of: winding an electric wire having a coating composed of insulating material to form a coil; providing an iron core; mounting the coil directly on the iron core; and bonding the coil and the iron core together by forming a bonding material composed of the insulating material over the coil and iron core so that a gap between the coil and the iron core is filled and the coil and the iron core are adhered together to form a unitary structure comprised of the coil directly mounted on the iron core.

12. A method of making an armature stator according to claim 11; wherein the insulating material comprises an inorganic material.

13. A method of making an armature stator according to claim 11; wherein the insulating material comprises a ceramic material.

14. A method of making an armature stator according to claim 11; further comprising the step of forming a filling material composed of the insulating material over the coil by vacuum impregnation for repairing defects in the coating disposed on the electric wire.

15. A method of making an armature stator according to claim 14; wherein the filling material and the bonding material are comprised of the same material.

16. A method of making an armature stator according to claim 14; wherein the filling material, bonding material and coating are all comprised of the same material.

17. A method of making an armature stator according to claim 14; further comprising the step of sintering the filling material formed over the coil.

18. A method of making an armature stator according to claim 11; further comprising the step of curing the bonding material formed over the coil and the iron core under high temperature.

19. A method of making an armature stator according to claim 11; wherein the coating and bonding material are comprised of the same material.

* * * * *